(12) United States Patent
Nickel (10) Patent No.: US 10,581,641 B2
(45) Date of Patent: Mar. 3, 2020

(54) DEVICE AND METHOD FOR IMPROVING THE RECEPTION QUALITY OF MESSAGES IN A CAN BUS SYSTEM

(71) Applicant: Robert Bosch GmbH, Stuttgart (DE)

(72) Inventor: Patrick Nickel, Birstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/442,014

(22) PCT Filed: Nov. 4, 2013

(86) PCT No.: PCT/EP2013/072912
§ 371 (c)(1),
(2) Date: May 11, 2015

(87) PCT Pub. No.: WO2014/072243
PCT Pub. Date: May 15, 2014

(65) Prior Publication Data
US 2015/0295734 A1    Oct. 15, 2015

(30) Foreign Application Priority Data

Nov. 9, 2012    (DE) .................. 10 2012 220 488

(51) Int. Cl.
*H04L 25/02* (2006.01)
*H04L 25/03* (2006.01)
*H04L 12/40* (2006.01)

(52) U.S. Cl.
CPC .......... *H04L 25/0212* (2013.01); *H04L 12/40* (2013.01); *H04L 25/025* (2013.01);
(Continued)

(58) Field of Classification Search
CPC ................. H04L 25/0212; H04L 12/40; H04L 25/03057; H04L 25/025; H04L 2012/40215
See application file for complete search history.

(56) References Cited

U.S. PATENT DOCUMENTS

| | | | |
|---|---|---|---|
| 4,757,715 A | * | 7/1988 | Miwa .................. G01N 29/343 73/599 |
| 5,347,541 A | | 9/1994 | Iltis et al. |

(Continued)

FOREIGN PATENT DOCUMENTS

| | | |
|---|---|---|
| JP | S52-109319 A | 9/1977 |
| JP | 2011-239091 A | 11/2011 |
| JP | 2011239091 A | 11/2011 |

OTHER PUBLICATIONS

International Search Report for PCT/EP2013/072903, dated Jan. 29, 2014.

(Continued)

*Primary Examiner* — Chirag G Shah
*Assistant Examiner* — Joshua Smith
(74) *Attorney, Agent, or Firm* — Norton Rose Fulbright US LLP; Gerard Messina (57) ABSTRACT

A user station for a bus system and a method for improving a reception quality of messages in a user station of a bus system are provided. The user station includes an estimation device for estimating a channel impulse response when and/or after only one further user station of the bus system transmits a message to the bus system, or for determining necessary functions of filters directly from a signal received by the user station, and a correction device for correcting a signal received by the user station based on the channel impulse response estimated by the estimation device.

12 Claims, 5 Drawing Sheets

(52) U.S. Cl.
CPC .......... *H04L 25/03057* (2013.01); *H04L 2012/40215* (2013.01)

(56) References Cited

U.S. PATENT DOCUMENTS

| | | | | |
|---|---|---|---|---|
| 5,870,433 | A * | 2/1999 | Huber | H04L 25/03197 375/233 |
| 5,933,797 | A * | 8/1999 | Haakansson | H04B 3/23 379/3 |
| 5,946,351 | A * | 8/1999 | Ariyavisitakul | H04L 25/03057 375/233 |
| 6,477,165 | B1 * | 11/2002 | Kosco | G06F 13/423 370/389 |
| 6,813,483 | B1 * | 11/2004 | Lynch | H04L 5/20 375/257 |
| 8,380,466 | B2 | 2/2013 | Nishiyama | |
| 2002/0037058 | A1 | 3/2002 | Birru | |
| 2002/0094014 | A1 * | 7/2002 | Kim | H04B 17/318 375/130 |
| 2002/0181567 | A1 | 12/2002 | Hamdi | |
| 2003/0016770 | A1 * | 1/2003 | Trans | H04B 1/00 375/346 |
| 2003/0081668 | A1 | 5/2003 | Yousef et al. | |
| 2003/0163748 | A1 * | 8/2003 | Calkins | H04B 15/04 370/463 |
| 2004/0151209 | A1 * | 8/2004 | Cummings | H04L 7/005 370/503 |
| 2005/0094715 | A1 * | 5/2005 | Hwang | H04B 1/7093 375/148 |
| 2007/0223376 | A1 * | 9/2007 | Soloviev | H04L 12/4135 370/230 |
| 2008/0089451 | A1 * | 4/2008 | Taylor | H04L 12/40006 375/346 |
| 2008/0101417 | A1 * | 5/2008 | Chapman | H04B 1/1027 370/497 |
| 2008/0259892 | A1 * | 10/2008 | Li | H04L 5/0003 370/342 |
| 2010/0030529 | A1 | 2/2010 | Nishiyama | |
| 2010/0131751 | A1 * | 5/2010 | Reznik | H04L 63/16 370/252 |
| 2010/0283629 | A1 * | 11/2010 | Andersson | H04L 12/413 340/870.07 |

OTHER PUBLICATIONS

Helmut Beikirch et al: "CAN—transceiver for field bus powerline communications", International Symposium on Power-Line Communications and Its Applications, Apr. 5, 2000-Apr. 7, 2011, pp. 257-264.

* cited by examiner

DEVICE AND METHOD FOR IMPROVING THE RECEPTION QUALITY OF MESSAGES IN A CAN BUS SYSTEM

FIELD OF THE INVENTION

The present invention relates to a user station for a bus system and to a method for improving the reception quality of messages in a user station of a bus system, in which in particular the reception quality during the transmission of information on a CAN bus system is improved even under unfavorable conditions, as they exist, for example, due to branchings, termination faults, mismatching or squeezed cables in the bus system.

BACKGROUND INFORMATION

The CAN bus system has become widely accepted for the communication between sensors and control units. In the CAN bus system, messages are transmitted with the aid of the CAN protocol as it is described in the CAN specification in ISO 11898. Most recently, techniques have also been proposed in this regard, such as CAN-FD, in which messages are transmitted, and the like, in accordance with the specification "CAN with Flexible Data-Rate, Specification Version 1.0" (source http://www.semiconductors.bosch.de). Such techniques increase the maximally possible data rate through the use of higher clocking in the area of the data fields above a value of 1 Mbit/s. In general, this comes at the expense of the transmission quality, for example in the form of a higher bit error rate, provided that the process is based on actually present bus topologies.

Actually present bus topologies generally deviate from the theory to the effect that reflections arise on the bus line in locations at which the bus line has an impedance which differs from theory. Such locations are, for example, branchings, termination faults, mismatching or squeezed cables, which in practical implementations are often encountered in stubs, passive star points, and the like, for example. The resulting reflections cause the temporal crosstalk of states on the bus line in such a way that a transmitted symbol or bit affects the chronologically subsequent symbols by crosstalk and optionally distorts their detection.

According to the CAN specification in ISO 11898, the bus line should be terminated on both sides with the line impedance, so that the transient events for the specified maximum cable length decay within a transmitted symbol and a clear state results at the end of the symbol interval. In reality, however, crosstalk between two or multiple CAN symbols is often impossible to avoid.

The receiver of a CAN bus system is composed of a communication processor, which is usually integrated into a microcontroller, and a transmitter/receiver, which is also referred to as a transceiver and usually designed as a separate chip having a direct connection to the bus line. In such a transceiver, the reception path usually includes only one comparator having upstream voltage dividers for matching the bias of the bus levels. The comparator directly evaluates the bus levels of dominant and recessive bit states and makes a decision at the output.

However, the direct formation and output of signal decisions have the disadvantage that effects of reflections on the bus line negatively influence the decision and may result in incorrect decisions in the signal transmission. This is in particular the case with higher clocking in the area of data fields above a value of 1 Mbit/s, as applies to CAN-FD, for example. Reflections, which in a conventional CAN bus systems having a lower clock rate still constructively contribute to the decision, already have a negative impact here due to the shortened bit duration.

In general, reflections at cable transitions toward a higher impedance result in reflections having a positive sign. In contrast, reflections at cable transitions toward lower impedances result in reflections having a negative sign. Temporal shifts arise based on two reflections at a different distance.

The considered reflections drastically limit the field of use, for example with respect to possible topologies, cable lengths, and the like, of presently considered techniques having higher clocking of the data transmission, such as CAN-FD, and the like.

While equalization methods for improving the detection quality in the receiver are generally known in the field of communication technology, a use for CAN communication systems is not yet known. In addition, the use of known equalization methods for CAN communication systems necessitates special measures since these were not considered in the system design.

SUMMARY

It is thus an object of the present invention to provide a user station for a bus system and a method, which solve the above-mentioned problems. In particular, a user station for a bus system and a method should be provided, which improve the reception quality during the transmission of information on a bus system, which in particular is a CAN bus system, even under the described unfavorable conditions of a real bus line.

The object is achieved by a user station for a bus system. The user station includes an estimation device for estimating a channel impulse response when and/or after only one further user station of the bus system transmits a message to the bus system, or for determining necessary functions of filters directly from a signal received by the user station, and a correction device for correcting a signal received by the user station based on the channel impulse response estimated by the estimation device.

The user station is also suitable for the use in higher clocked systems, such as CAN-FD, and the like, for example. In one specific embodiment, the functionality of the user station with respect to the received signal may also in particular be implemented as a preprocessing step in a transmitter/receiver, or transceiver, or a CAN transceiver or a transceiver chip set or a CAN transceiver chip set. In particular, it is possible for the considered functionality to be embedded either into the transceiver as a separate electronic component (chip) or into an integrated overall approach, in which only one electronic component (chip) is present.

The user station is able to achieve improved reception in a CAN communication system and thus offers greater reliability. The bus signal is not directly decided as previously by a comparator or the like, but is (beforehand) corrected, for example, by additional filtering and feedback of previously decided reception values. It is also possible to represent the decisions with the aid of hypotheses and also to further process the decided reception values.

The estimation device is possibly designed in such a way that it carries out the estimation of the channel impulse response based on an LMS algorithm or an RLS algorithm, or that it directly determines the channel impulse response.

The estimation device may be configured in such a way that it uses parameters and/or coefficients of previously received messages during the estimation of the channel impulse response, the messages being assigned to the appropriate transmitting station by the message identifier.

The estimation device may also be configured in such a way that it represents beforehand a result of its estimation with the aid of hypotheses. The correction device may be configured to further process reception values decided according to the DDFSE algorithm, for example.

It is possible for the correction device to additionally be configured to correct the signal received by the user station according to a DFE algorithm or a BCJR algorithm or a DDFSE algorithm.

The correction device may also include a filter for correcting the signal received by the user station, the signal-to-interference power ratio being maximized, or appropriately optimized, at the particular decision point in time at the input of the filter, for example. A further filter may be used for filtering reception values which were previously decided according to the DDFSE algorithm, and the correction device may be configured to feed back the output of the filter.

The user station preferably additionally includes a transceiver for the direct connection to a bus line of the bus system, and a communication control device for processing the signals received by the transceiver and for providing the messages to be transmitted by it in the form of signals, the estimation device and/or the correction device being part of the transceiver or the communication control device.

The above-described user station may form part of a bus system which additionally includes a bus line and at least two user stations, which are connected to each other via the bus line in such a way that they are able to communicate with each other. At least one of the at least two user stations is an above-described user station.

The above-mentioned object is furthermore achieved by a method for improving a reception quality of messages in a user station of a bus system. The method includes the steps: estimating, with the aid of an estimation device, a channel impulse response when and/or after only one further user station of the bus system transmits a message to the bus system, or determining, with the aid of the estimation device, necessary functions of filters directly from a signal received by the user station, and correcting, with the aid of a correction device, a signal received by the user station based on the channel impulse response estimated by the estimation device.

The method is in particular also suitable for use in higher clocked systems, such as CAN-FD and the like, for example, and in one specific embodiment may be implemented in particular as a preprocessing step in the user station. Moreover, the method may also be applied to other systems having a similar structure, such as FlexRay and the like.

The method offers the same advantages as those mentioned above with respect to the user station.

Further possible implementations of the present invention also include not explicitly described combinations of features or specific embodiments which are described at the outset or hereafter with respect to the exemplary embodiments. Those skilled in the art will also add individual aspects as improvements or supplements to the particular basic form of the present invention.

DETAILED DESCRIPTION

In the figures, identical or functionally equivalent elements are denoted by the same reference numerals, unless indicated otherwise.

Figure 1:
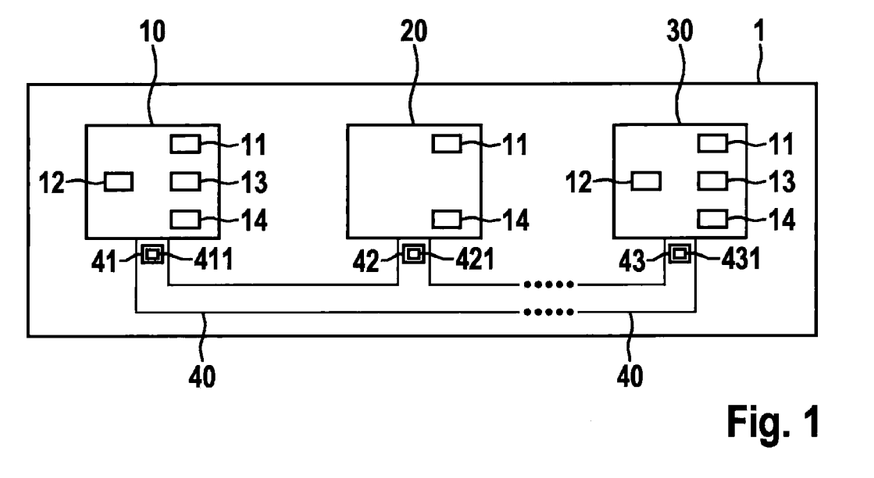
FIG. 1 shows a simplified block diagram of a bus system according to a first exemplary embodiment.

FIG. 1 shows a bus system 1, which may be a CAN bus system, a CAN-FD bus system and the like, for example. Bus system 1 may be used in a vehicle, in particular a motor vehicle, an airplane and the like, or in a hospital and the like.

In FIG. 1, bus system 1 has a plurality of user stations 10, 20, 30, which are each connected to a bus line 40. Messages 41, 42, 43 in the form of signals are transmittable between individual user stations 10, 20, 30 via bus line 40. Messages 41, 42, 43 in each case have one of message identifiers 411, 421, 431. User stations 10, 20, 30 may be control units or display devices of a motor vehicle, for example.

As shown in FIG. 1, user station 10 includes a communication control device 11, an estimation device 12, a correction device 13, and a transceiver 14. User station 20, in contrast, includes a communication control device 11 and a transceiver 14. User station 30, like user station 10, includes a communication control device 11, an estimation device 12, a correction device 13, and a transceiver 14. Transceivers 14 of user stations 10, 20, 30 are directly connected in each case to bus line 40, even though this is not shown in FIG. 1.

Communication control device 11 is used to control a communication of the particular user station 10, 20, 30 via bus line 40 with another user station of user stations 10, 20, 30 connected to bus line 40. Estimation device 12 and correction device 13 are used to improve the reception quality of message 41, 42, 43 received by transceiver 14, as is described in greater detail hereafter. Communication control device 11 may be designed as a conventional CAN controller. Transceiver 14 may be designed as a conventional CAN transceiver with respect to its transmission functionality. Accordingly, it is possible to improve the quality of the signal received by transceiver 14 with the aid of the two user stations 10, 30, the signal being based on one of messages 41, 42, 43. User station 20, in contrast, corresponds to a conventional CAN user station, both with respect to its transmission functionality and its reception functionality.

Figure 2:
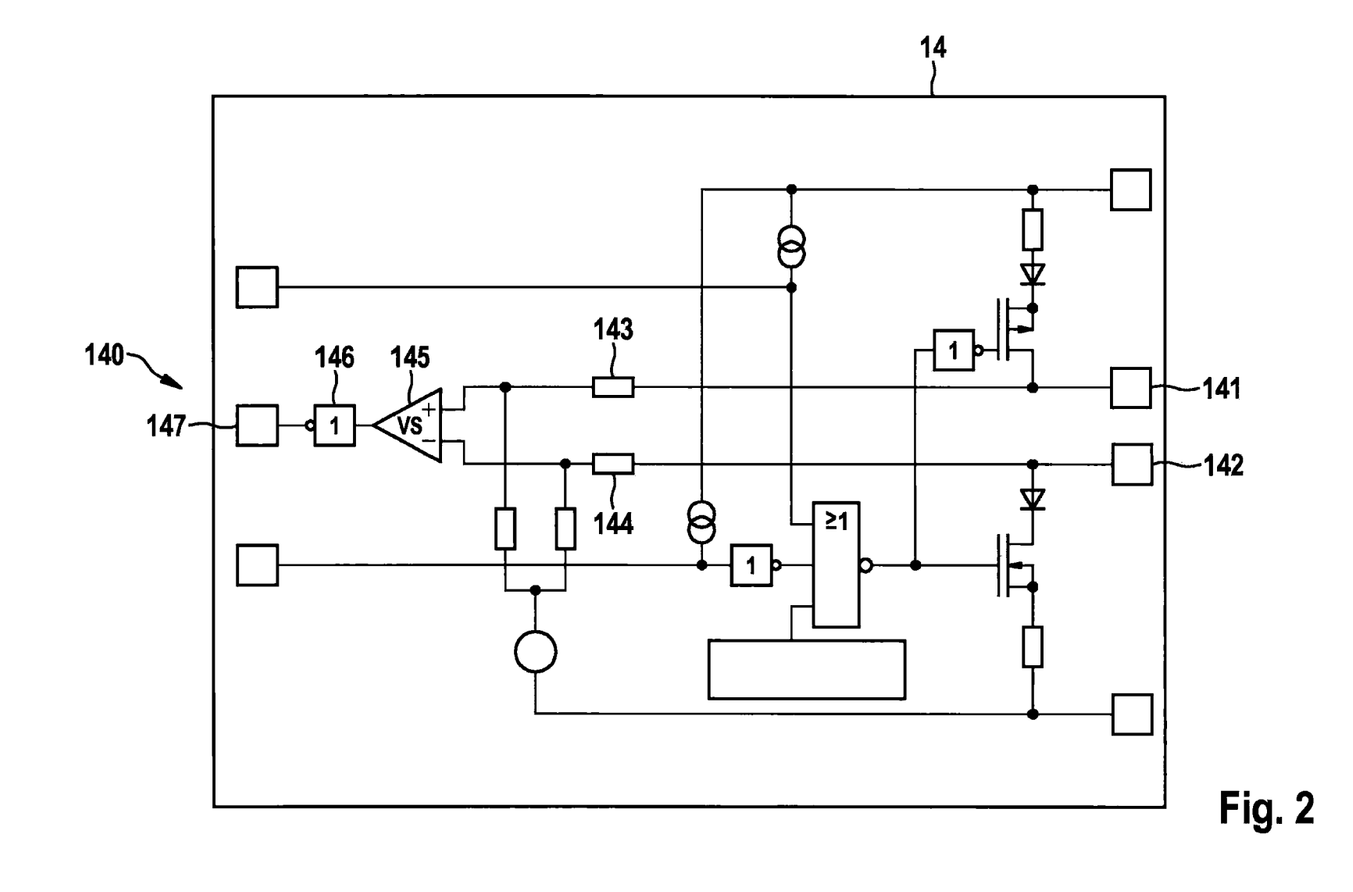
FIG. 2 shows an electrical circuit diagram of a transceiver of the bus system according to the first exemplary embodiment.

FIG. 2 shows the composition of a transceiver 14 of user station 20 in greater detail by way of example. Transceiver 14 has a reception path 140 for receiving the signal which is based on one of messages 41, 42, 43. A first and second input connection 141, 142, two resistors 143, 144, a comparator 145, a processing member 146, and an output connection 147 are situated in the reception path. Resistor 143 is situated between a first input of comparator 145, the input having a positive potential, and first input connection 141. Resistor 144 is situated between a second input of comparator 143, the input having a negative potential, and second input connection 142.

Figure 3:
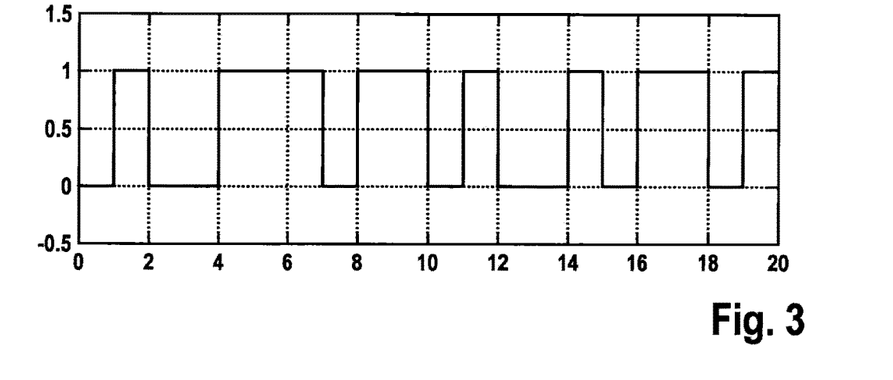
FIG. 3 shows a signal curve of a transmission signal which is transmitted via the bus system according to the first exemplary embodiment.

FIG. 3 through FIG. 7 show examples of the transmission/reception signals of transceivers 14. In these examples, one of transceivers 14 of user stations 10, 20, 30 in each case feeds one of messages 41, 42, 43 to bus line 40 in the form of a signal, as indicated in FIG. 3. The vertical axis in FIG. 3 through FIG. 7 in each case represents the level difference of the message, the level difference being plotted against the time (horizontal axis) in μs.

Figure 4:
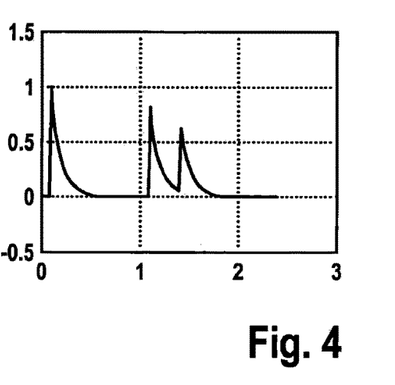
FIG. 4 shows a first example of a channel impulse response to the signal curve shown in FIG. 3.
Figure 5:
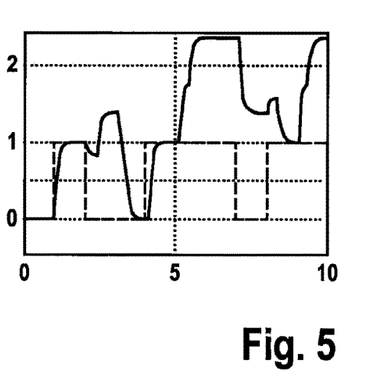
FIG. 5 shows a signal curve of a reception signal which is received by the transceiver of FIG. 2 during a channel impulse response according to FIG. 4.

If the channel impulse response according to a first example is as shown in FIG. 4, communication control device 11 of user station 20 receives a signal as illustrated in FIG. 5.

Figure 6:
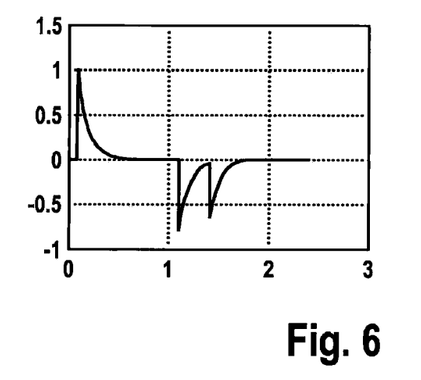
FIG. 6 shows a second example of a channel impulse response to the signal curve shown in FIG. 3.
Figure 7:
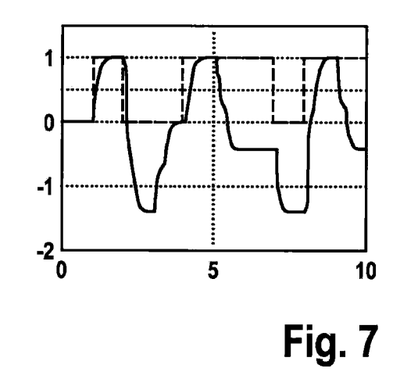
FIG. 7 shows a signal curve of a reception signal which is received by the transceiver of FIG. 2 during a channel impulse response according to FIG. 6.

In contrast, if the channel impulse response according to a second example is as shown in FIG. 6, communication control device 11 of user station 20 receives a signal as illustrated in FIG. 7.

In the first example shown in FIG. 3 through FIG. 7, in contrast, communication control devices 11 of user stations 10, 30 receive a signal which is very similar, or almost identical, to the transmission signal of FIG. 3 as a result of their estimation device 12 and correction device 13.

Figure 8:
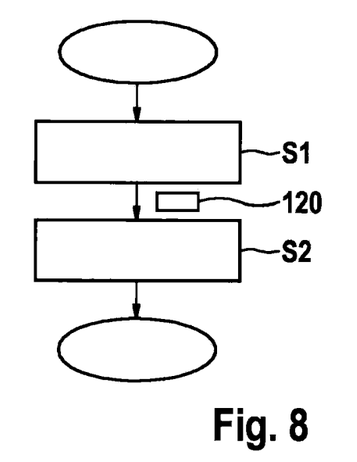
FIG. 8 shows a flow chart of a method according to the first exemplary embodiment.

FIG. 8 shows a method for improving the reception quality of a signal, which is based on one of messages 41, 42, 43, in a user station 10, 30 of bus system 1. The method is described based on one example, in which user station 10 transmits message 41 to user station 30.

Accordingly, in step S1 of FIG. 8 estimation device 12 of user station 30 estimates channel impulse response 120 which is generally to be expected in the case of an actually installed bus line 40 for the transmission channel (channel impulse response) of the two users. For this purpose, estimation device 12 establishes a hypothesis which is based on experiences made over the course of a transmission between user station 10 as the transmitter and user station 30 as the receiver. The hypothesis of estimation device 12 may thus also be referred to as the result of a learning process.

Multiple user stations 10, 20, 30 are active in a CAN bus system, which transmits their messages 41, 42, 43 including message identifiers 411, 421, 431. These message identifiers 411, 421, 431 are used for arbitration during the arbitration phase. After the arbitration, only one user station of user stations 10, 20, 30 transmits signals in the form of one or multiple of messages 41, 42, 43 to bus line 40. Starting at this moment, each listening user station 10, 20, 30 may observe the bus signals or messages 41, 42 43 and, based thereon, estimate channel impulse response 120 with the aid of their estimation device 12. This may also be carried out adaptively and during the detection. In this case, a learning system is present.

Estimation device 12 of user station 30 then makes estimated channel impulse response 120 available to correction device 13.

Based on channel impulse response 120 estimated by estimation device 12, in a step S2 correction device 13 thereupon corrects the signal received by user station 30, which is based on message 41. The method is then terminated.

In principle there is no delay of the signal or of message 41, 42, 43 since the delay is within the time frame tolerated by the CAN protocol, but a delay may be used through optimization measures, e.g., in methods using hypotheses and delayed decision, provided the application is able to tolerate this. For this purpose, a delay of 1 to 2 symbol clock pulses may already be sufficient.

Estimation device 12 of user station 30 operates in a similar manner when user station 20 transmits one of messages 41, 42, 43 to user station 30. Moreover, estimation device 12 of user station 10 operates in a similar manner when it receives one of messages 41, 42, 43 from one of user stations 20, 30.

In this way, the reception quality during the transmission of information on bus system 1 may be improved even under unfavorable conditions, such as branchings, termination faults, mismatching or squeezed cables in bus system 1.

Figure 9:
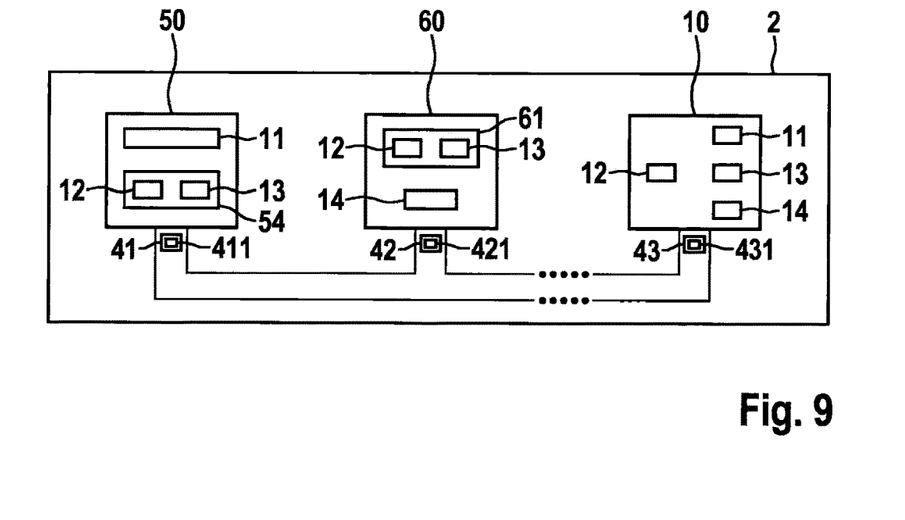
FIG. 9 shows a simplified block diagram of a bus system according to a second exemplary embodiment.

FIG. 9 shows a bus system 2 according to a second exemplary embodiment. In addition to at least one user station 10, which is composed as in the first exemplary embodiment, bus system 2 includes at least one user station 50 and at least one user station 60. User stations 10, 50, 60 are each connected to bus line 40, as in the first exemplary embodiment. Messages 41, 42, 43 in the form of signals are transmittable between individual user stations 10, 50, 60 via bus line 40, as in the first exemplary embodiment. Again, messages 41, 42, 43 in each case have one of message identifiers 411, 421, 431. User stations 50, 60 may also be control units or display devices of a motor vehicle, and the like, for example.

As shown in FIG. 9, each of user stations 10, 50, 60 includes an estimation device 12 and a correction device 13. However, in user station 50, estimation device 12 and correction device 13 are part of a transceiver 54. However, in user station 60, estimation device 12 and correction device 13 are part of a communication control device 61. Communication control device 11 of user station 50 is otherwise identical to communication control device 11 of user station 10. Moreover, transceiver 54 of user station 50 is otherwise identical to transceiver 14 of user station 10.

Figure 10:
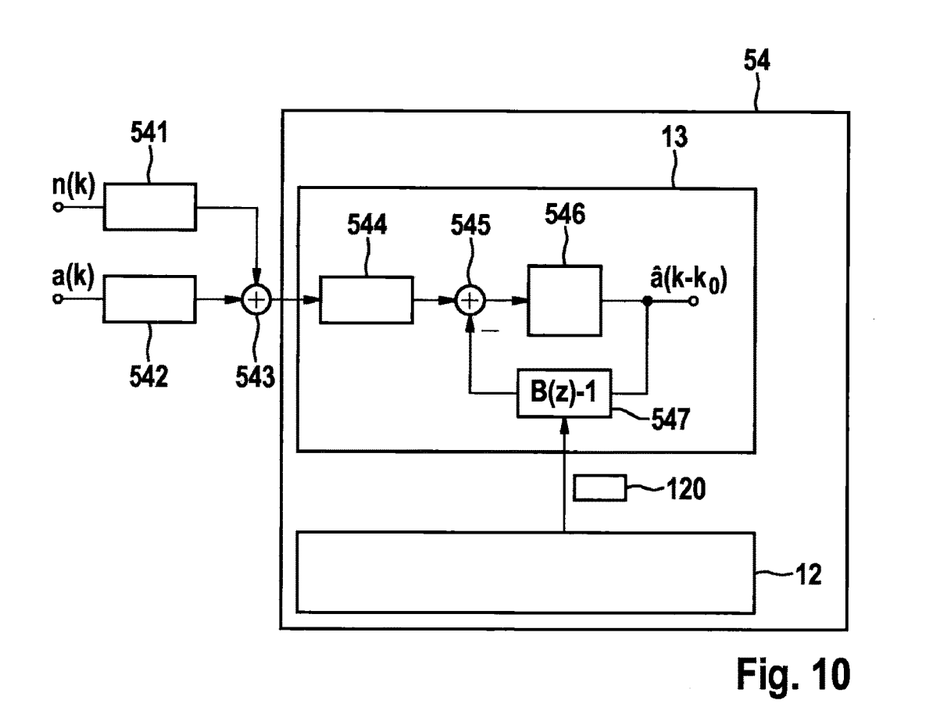
FIG. 10 shows a block diagram to explain the function of an estimation device and a correction device of the bus system according to the second exemplary embodiment.

FIG. 10 shows the composition of estimation device 12 and correction device 13 of transceiver 54, which are used instead of comparator 145 (FIG. 2). Correction device 13, for example, forms a decision-feedback equalization structure, which hereinafter is also referred to as a DFE structure, as shown in FIG. 10. Estimation device 12 supplies channel impulse response 120 which is required for the correction and may be represented by a signal b(k).

FIG. 10 shows the schematic design of a DFE structure having an upstream channel model. The interference on the channel or on bus line 40 is represented by a signal n(k) and a filter 541 having transmission function G(z), which corresponds to the z-transform of the discrete-time sequence g(k). The reception signal at user stations 10, 50, 60 results from a transmission signal a(k) after passing through a channel which is modeled by a filter 542 having transmission function H(z). At point 543, the resulting signals are added and then supplied to a filter 544. Filter 544 thus receives at its input the signal received by user station 50. Filter 544 is a possible additional filter in transceiver 54 having a transmission function F(z), which may be used to concentrate the signal energy; however, it may be assumed to have a constant transmission function, such as F(z)=1, for example, for a simplified consideration. Thereafter, the modeled interference is subtracted at point 545 from the signal output by filter 544. As the resulting total channel, normalized channel impulse response 120 is composed of the channel modulated with filter 542 and the output of filter 544. The run time-compensated total channel is represented by B(z), the z-transform of b(k), in FIG. 10. The value at the point k=0 represents the main tap considered for the decision, and the following values at the points k>0 correspond to the taps of preceding symbols. b(k)=0 applies to the coefficients b(k) of channel impulse response 120, so that the main tap of filter 547 is eliminated, which is represented by the term −1 of filter 547 given by B(z)−1. Signal â(k−$k_0$) resulting from the compensation by the correction signal after addition stage 545 is then supplied to a decider 546, which corresponds to comparator 145 of the first exemplary embodiment. Thereafter, the reception signal corrected by correction device 13 is available for communication control device 11 for further processing. In FIG. 10, the term $k_0$ represents a decision delay, having a delay $k_0$ of the filter signal downstream from filter 544 which may be optimized by filter 544 having transmission function F(z) and here is assumed to be $k_0$=0 for a simplified consideration.

The following applies, for example:
example channel impulse response h(k)=δ(k)+0.5 δ(k−1)+0.2 δ(k−2)
prefilter impulse response f(k)=δ(k)=>F(z)=constant
decision delay $k_0$=0

For this case, b(k)=h(k) is a useful approach, and B(z)−1 corresponds to channel impulse response b(k)−δ(k)=h(k)−δ(k)=0.5 δ(k−1)+0.2 δ(k−2). It is easily apparent here that only symbols which have already been decided and are known are used for feedback since the instantaneous decision point in time corresponds to k, and this impulse response only takes terms into consideration which are based on reception values (k−1, k−2) lying in the past.

While estimation device 12 and correction device 13 are very simple to implement in transceiver 54, their implementation in communication control device 11 is also possible, as is shown by communication control device 61.

The method according to this exemplary embodiment observes the CAN bus signal during the transmission and corrects the signal with the aid of the above-described DFE structure. Having knowledge of the channel impulse response is advantageous for this purpose, the channel impulse response being dependent on the pairing of the transmitter and receiver, as described in the first exemplary embodiment. The channel impulse response may be determined as described in the first exemplary embodiment.

All above-described embodiments of bus system 1, user stations 10, 20, 30 and of the method may be used individually or in any possible combinations. In addition, in particular the following modifications are conceivable.

The above-described bus system 1, 2 according to the first and second exemplary embodiments is described based on a bus system which is based on the CAN protocol. Bus system 1 according to the first and second exemplary embodiments, however, may also be a different type of communication network. It is advantageous, but not a necessary prerequisite, to ensure an exclusive, collision-free access of a user station 10, 20, 30, 50, 60 to a shared channel in bus system 1, 2, at least for certain time periods.

Bus system 1, 2 according to the first and second exemplary embodiments is in particular a CAN network or a TTCAN network or a CAN-FD network.

The number and arrangement of user stations 10, 20, 30, 50, 60 in bus systems 1, 2 of the first and second exemplary embodiments are arbitrary. In particular, it is possible for only user stations 10 or user stations 50 or user stations 60 to be present in bus systems 1, 2 of the first and second exemplary embodiments.

Instead of the decision-feedback equalization structure (DFE structure) described in the first exemplary embodiment for estimation device 12 and correction device 13, it is also possible to employ arbitrary trellis-based equalization methods, such as the BCJR algorithm (the individual letters in BCJR denote the initials of the developers: B for L. Bahl, C for J. Cocke, J for F. Jelinek, R for J. Raviv,) and/or a DDFSE algorithm (DDFSE=delayed decision–feedback sequence estimation).

Various fields of application of the user station and of the method carried out by the same are conceivable. In addition to the use for CAN and CAN-FD, in particular also an application in FlexRay is conceivable. These systems do not as yet use any equalization methods in the receiver of the receiving user station.

The method may be separately optimized for any special application, such as CAN-FD, FlexRay, and the like. The application may also be automatically identified and accordingly adapted for multiple fields of application. For example, the method must be carried out faster with CAN-FD than with CAN, so that no delay is created which is longer than the one tolerated by the particular protocol.

The determination of channel impulse response 120 used for equalization forms a basis for the method. It may be obtained by estimating channel impulse response 120 of the transmission channel of bus line 40. Alternatively, channel impulse response 120 may also be directly determined or optimized in the form of signal b(k). The estimation of channel impulse responses 120 may be carried out using all suitable methods. Since no training sequence is available, in particular adaptive methods are suitable, such as a least mean squares (LMS) algorithm and/or a recursive least squares (RLS) algorithm.

In order to stabilize the estimation and increase the accuracy of channel impulse response 120, the parameters and coefficients of previously received messages 41, 42, 43 or packets of messages 41, 42, 43, which may also be referred to as reception bursts, may be assigned to the message identifiers or the transmitting user stations, and be used for chronologically received messages 41, 42, 43 or packets of messages 41, 42, 43.

In addition or as an alternative to the estimation of the channel or of its channel impulse response 120, filters 541, 542, 544 in transceiver 14, 54, 61 may be optimized. For this purpose, filters 544 (transmission function F(z)) and 547 (transmission function B(z)−1) and decision delay $k_0$ are considered. Different criteria may be used for the optimization, such as a maximization of the signal-to-interference power ratio at the input of decider 546.

Alternatively, required filter coefficients 544, 547 are provided by the estimation device without explicit estimation of channel impulse response 120, but are determined directly from the signal received by user stations 10, 50, 60.

User stations 10, 30, 50 represent an option, in particular for CAN-FD, for increasing the reception quality of CAN-FD into the range of customary CAN transmissions using a considerably higher data rate.

With respect to the functionality regarding the reception signal, the method may be implemented, for example, in a transceiver 14, 54, in a communication control device 61, and the like. In addition or as an alternative, it may be integrated into existing products.

What is claimed is:

1. A user station for a bus system, comprising:
a receiver for receiving a signal from the bus system;
an estimation device for estimating a channel impulse response at least one of when and after only one further user station of the bus system transmits a message to the bus system;
a correction device for correcting the signal received by the user station based on the channel impulse response estimated by the estimation device; and
a decider device that is supplied with the corrected signal and decides bit states for the corrected signal, wherein the correction device includes:
a first filter in which a main tap thereof is eliminated and in which a transmission function thereof corresponds to a z-transform of the channel impulse response,
a second filter that receives the signal from the bus system and has a second transmission function, and
an addition stage device, wherein an output of the first filter corresponding to a modeled interference and an output of the second filter are supplied to the addition stage device in which the modeled interference is subtracted from the output of the second filter, and wherein an output of the addition stage device is supplied to the decider device.

2. The user station as recited in claim 1, wherein the estimation device one of:
carries out the estimation of the channel impulse response based on one of an LMS algorithm and an RLS algorithm, and
determines the channel impulse response directly from a transmission signal.

3. The user station as recited in claim 1, wherein the correction device corrects the signal received by the user station according to one of a DFE algorithm, a BCJR algorithm, and a DDFSE algorithm.

4. The user station as recited in claim 1, further comprising:
a transceiver for a direct connection to a bus line of the bus system; and
a communication control device for processing a signal received by the transceiver and for providing a message to be transmitted by the transceiver in the form of a signal, wherein at least one of the estimation device and the correction device is part of one of the transceiver and the communication control device.

5. The user station as recited in claim 1, wherein the estimation device uses at least one of parameters and coefficients of previously received messages during the estimation of the channel impulse response, the at least one of the parameters and the coefficients are as a result of a message identifier assigned to a user station which has transmitted the received message.

6. The user station as recited in claim 1, wherein an output of the decider device is fed back to an input of the first filter.

7. A bus system, comprising:
a bus line; and
at least two user stations connected to each other via the bus line in such a way that the user stations are able to communicate with each other, wherein at least one of the at least two user stations including:
an estimation device for estimating a channel impulse response at least one of when and after only one further user station of the bus system transmits a message to the bus system,
a correction device for correcting a signal transmitted on the bus and received by the user station, the correcting being based on the channel impulse response estimated by the estimation device; and
a decider device that is supplied with the corrected signal and decides bit states for the corrected signal, wherein the correction device includes:
a first filter in which a main tap thereof is eliminated and in which a transmission function thereof corresponds to a z-transform of the channel impulse response,
a second filter that receives the signal from the bus system and has a second transmission function, and
an addition stage device, wherein an output of the first filter corresponding to a modeled interference and an output of the second filter are supplied to the addition stage device in which the modeled interference is subtracted from the output of the second filter, and wherein an output of the addition stage device is supplied to the decider device.

8. The bus system as recited in claim 7, wherein the estimation device uses at least one of parameters and coefficients of previously received messages during the estimation of the channel impulse response, the at least one of the parameters and the coefficients are as a result of a message identifier assigned to a user station which has transmitted the received message.

9. The bus system as recited in claim 7, wherein an output of the decider device is fed back to an input of the first filter.

10. A method for improving a reception quality of a message in a user station of a bus system, comprising:
receiving, by the user station, a signal from the bus system;
estimating, with the aid of an estimation device, a channel impulse response at least one of when and after only one further user station of the bus system transmits a message to the bus system;
correcting, with the aid of a correction device, the signal received by the user station based on the channel impulse response estimated by the estimation device; and
supplying the corrected signal to a decider unit device that decides bit states for the corrected signal, wherein the estimating correcting includes:
providing a first filter in which a main tap thereof is eliminated and in which a transmission function thereof corresponds to a z-transform of the channel impulse response,
providing a second filter that receives the signal from the bus system and has a second transmission function, and
providing an addition stage device, wherein an output of the first filter corresponding to a modeled interference and an output of the second filter are supplied to the addition stage device in which the modeled interference is subtracted from the output of the second filter, and wherein an output of the addition stage device is supplied to the decider device.

11. The method as recited in claim 10, wherein the estimating involves using at least one of parameters and coefficients of previously received messages during the estimation of the channel impulse response, the at least one of the parameters and the coefficients are as a result of a message identifier assigned to a user station which has transmitted the received message.

12. The method as recited in claim 10, wherein an output of the decider device is fed back to an input of the first filter.

* * * * *